A. S. HIBBARD.

ELECTRICAL RECORDER.

APPLICATION FILED FEB. 26, 1915.

Reissued Aug. 29, 1916.

14,188.

2 SHEETS—SHEET 1.

Witnesses:

Robert F. Bracke

Albin C. Ahlberg

Inventor

Angus S. Hibbard

By Lynn A. Williams

Attorney

A. S. HIBBARD.

ELECTRICAL RECORDER.

APPLICATION FILED FEB. 26, 1915.

Reissued Aug. 29, 1916.

14,188.

2 SHEETS—SHEET 2.

Witnesses:
Albin C. Ahlberg;
Robert F. Bracke

Inventor
Angus S. Hibbard
By Raymond C. Williams
Attorney

UNITED STATES PATENT OFFICE.

ANGUS S. HIBBARD, OF CHICAGO, ILLINOIS.

ELECTRICAL RECORDER.

14,188. Specification of Reissued Letters Patent. Reissued Aug. 29, 1916.

Original No. 1,114,612, dated October 20, 1914, Serial No. 677,580, filed February 14, 1912. Application for reissue filed February 26, 1915. Serial No. 10,881.

*To all whom it may concern:*

Be it known that I, ANGUS S. HIBBARD, a citizen of the United States, residing at Chicago, in the county of Cook and State of Illinois, have invented certain new and useful Improvements in Electrical Recorders, of which the following is a specification.

This invention relates to devices for making a count or tally of the performance or output of various machines such as clocks, vehicle wheels, printing presses, etc., and its object is to provide a simple means for recording the count on a paper sheet, slip, tape or similar device for preserving the record.

The accompanying drawings illustrate two principal forms depending respectively upon electro-thermal and electro-chemical action for impressing the record of the transmitting device upon a tally-sheet without employing any moving parts in the receiver.

Figure 1:
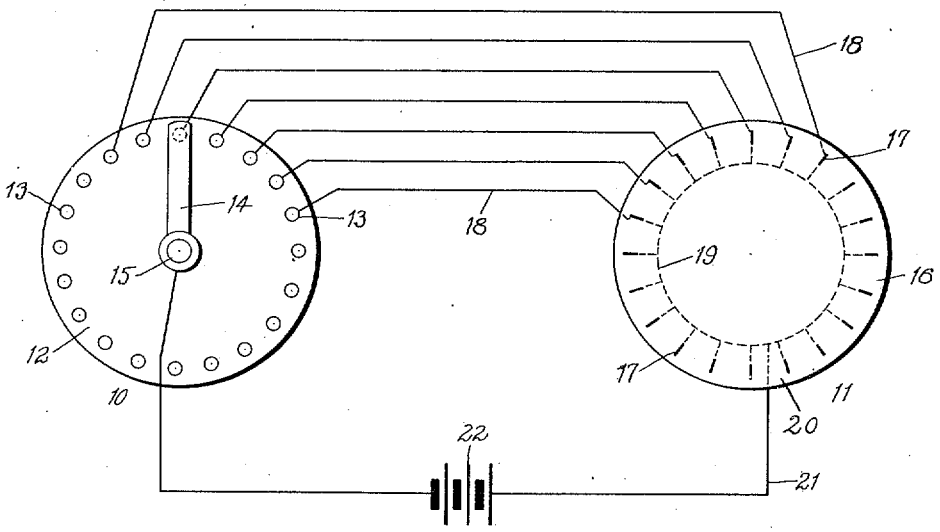
Figure 2:
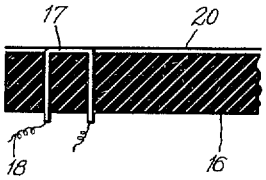
Figure 3:
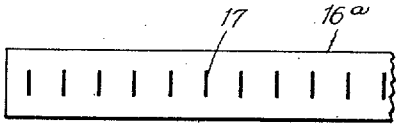
Figure 4:
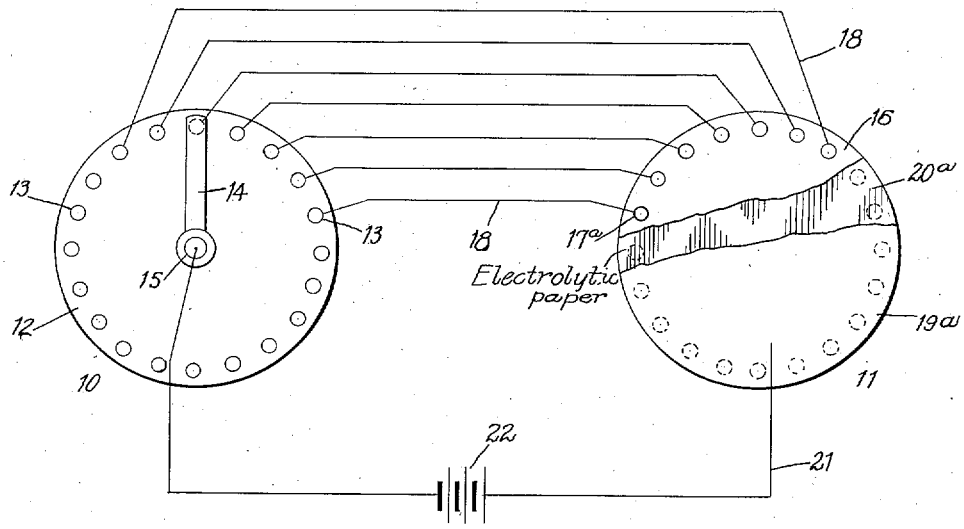
Figure 5:
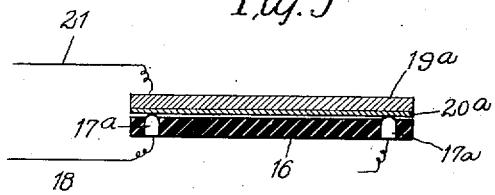

Figure 1 of the drawings is a diagrammatic view of an electro-thermal recording apparatus constructed according to my invention. Fig. 2 represents a partial cross-section of the receiver. Fig. 3 represents a plan view of a modified or rectilinear receiver. Figs. 4 and 5 are views similar to Figs. 1 and 2 representing a modification which involves electro-chemical action.

Referring at first to Figs. 1 and 2, 10 is the sending and 11 the receiving apparatus, the former as here shown comprising a commutator consisting of a fixed insulating disk 12 carrying a series of electrical contact points 13 and a revolving brush 14 attached to a shaft 15 and adapted to make successive or selective contact with said points.

The receiver 11 as shown is without moving parts and consists of an insulating disk 16 having a series of heating elements or conductors 17 exposed on its upper face and connected by circuit wires 18 with the respective contact points of the commutator 10 together with a wire 19 connecting all of the elements 17. These heating elements may be composed of fine platinum wire or of any suitable resistance material adapted to be heated, preferably to a dull red heat, by the passage of an electric current through the element. Above the disk 16 and in contact with all of the heating elements 17 is a tally sheet or slip 20 (Fig. 2) composed of paper or other suitable material adapted to be charred, perforated or seared by said elements, and this sheet, if composed of paper, cloth or the like, may be treated with a suitable fire-proofing solution in order to prevent it from being consumed or set afire. The sheet may be pressed against the heating elements by an insulating plate (not shown). Wire 19 is connected by a return-circuit wire 21 with the brush 14, and in said wire is interposed a battery 22 or other source of current.

In operation, as the brush 14 revolves, it sends current successively through the several circuit wires 18, and as the current passes through any one of the elements 17, the latter will become sufficiently hot to leave a mark on the tally sheet. The number of these marks corresponds to the number of contacts 13 on the commutator over which the brush 14 has passed while the current is on and the tally sheet in place.

The shaft 15 may be connected with any suitable machine whose performance or output it is desired to count. For example this shaft can be connected with clockwork, and the device will then furnish a convenient means for recording the time of a message on a telephone toll line. If there are twenty contact points 13 equally spaced around the disk 12 and the brush 14 should make one revolution in ten minutes there would then be recorded on the tally sheet 20 one dot or mark for every thirty seconds of elapsed time. One of these sheets would be inserted at the beginning of a conversation and removed when the message is completed. The shaft 15 may also be actuated in various other ways, as by means of a vehicle wheel, thus constituting the device an odometer; by a printing press, to record the number of papers printed thereby, etc.

Fig. 3 represents a modification in which the heating elements 17, instead of being arranged in a circle, are disposed in a straight line or row and adapted to be employed with a tally sheet and a supporting block 16ª of similar form.

In the modification shown in Figs. 4 and

I employ electro-chemical in place of electro-thermal action for the purpose of making marks upon a tally sheet 20[a], the latter being composed of paper or other suitable material impregnated with a salt, such as potassium iodid applied in solution with water and starch. This sheet, being moistened and placed between contacts 17[a] on the receiver disk 16 and a conductive cover plate 19[a], will receive blue marks from said contacts due to the decomposition of the electrolytic salt when current is passed through the paper from any one of the contacts to the conductive plate. The contacts could be arranged in a straight line as in Fig. 3, or in any other suitable way.

Various other modifications may be made without departing from the spirit of my invention.

One of the important advantages of the invention is that it may be made as shown to dispense with any moving parts at the receiving end, and it also avoids a mechanical connection between the sending and receiving devices.

In both embodiments here illustrated, the necessary voltage of the current is only such as to produce a conductive as distinguished from a disruptive discharge at the marking points. Hence the electrical apparatus for both transmitting and recording may be very simple, and the two instruments may be located at stations comparatively remote from each other and connected by wires which do not have to be highly insulated.

I claim—

1. Electrical transmitting and recording apparatus comprising a transmitter having a series of fixed terminals and a brush for successively contacting therewith, a recording instrument having a series of stationary marking elements, a stationary tally sheet in contact with said elements, individual circuit-wires connecting said terminals and elements, and a return circuit-wire connecting said elements with the brush and provided with a source of low-voltage current.

2. In combination a plurality of high resistance electrical conductors in fixed positions, means for supporting a record sheet of paper in fixed position in contact with said high resistance conductors, a source of electrical energy and means for selectively connecting said high resistance conductors with said source of electrical energy, the voltage of said source being such that when any of the said conductors is connected with the source of energy that conductor is heated to a temperature such as to scorch the portion of the record sheet in contact therewith.

3. In combination a suitable frame of insulating material, a plurality of high resistance conductors supported in said frame, means for supporting a record sheet of paper in contact with all of said conductors, a source of electrical energy such that the connection of any of said conductors therewith will cause the connected conductor to become heated due to its resistance to the flow of current therethrough, and means for connecting said conductors in circuit with said source of electrical energy.

4. In combination means for supporting a record sheet of paper in fixed position, a plurality of high resistance wires in fixed position each lying entirely on one side of said record sheet and in proximity thereto and means for passing an electric current selectively through any one of said wires thereby causing its temperature to be raised to a point at which its heat will scorch the portion of the record sheet in immediate proximity therewith.

5. In combination, means for supporting a record sheet of paper, a plurality of high resistance wires each lying entirely on one side of said record sheet and in fixed proximity thereto and means for passing an electric current through any one of said wires thereby causing its temperature to be raised to a point at which its heat will scorch the portion of the record sheet in immediate proximity therewith.

6. In combination means for supporting a record sheet of paper in given position, a plurality of electrically energized heating elements each lying in a fixed position entirely on one side of said record sheet and in proximity thereto and means for passing an electric current selectively through any one of said heating elements thereby causing its temperature to be raised to a point at which its heat will scorch the portion of the record sheet in immediate proximity therewith.

7. In combination means for supporting a record sheet of paper, a plurality of continuous electrical conductors of high resistance lying in fixed positions substantially in contact with said record sheet and a source of electric current with which any of said conductors may be connected, the voltage of said source and the resistance of said conductors being such that the connection of any conductor in circuit with the source will cause the temperature of the conductor to rise to a point at which its heat will scorch the immediately adjacent portion of the paper.

8. In combination means for supporting a record sheet of paper, a plurality of electrically heated recording elements each comprising a continuous conductor of high resistance and all substantially in contact in fixed positions with said paper when said sheet of paper is supported in position, a source of electric energy and switching mechanism for selectively closing a circuit from said source of current through any one of said recording elements while the non-energization of all of the other recording elements is maintained and while all of said elements are maintained substantially in contact with said sheet of paper in said fixed positions.

In witness whereof, I hereunto subscribe my name this 9th day of February, A. D. 1915.

ANGUS S. HIBBARD.

Witnesses:
H. A. NEIBURGER,
A. C. AHLBERG.